United States Patent
Spears

(10) Patent No.: US 9,332,396 B2
(45) Date of Patent: May 3, 2016

(54) SYSTEMS AND METHODS TO PROVIDE LOCATION-DEPENDENT INFORMATION DURING AN OPTIMAL TIME PERIOD

(71) Applicant: Visa International Service Association, San Francisco, CA (US)

(72) Inventor: Joseph Spears, Hayward, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 14/658,987

(22) Filed: Mar. 16, 2015

(65) Prior Publication Data

US 2015/0264532 A1    Sep. 17, 2015

Related U.S. Application Data

(60) Provisional application No. 61/954,316, filed on Mar. 17, 2014.

(51) Int. Cl.
*H04W 4/02* (2009.01)

(52) U.S. Cl.
CPC ................................... *H04W 4/028* (2013.01)

(58) Field of Classification Search
CPC ....... H04W 4/02; H04W 64/00; H04W 4/028; H04L 29/08657; H04L 29/08108; H04L 29/08936
See application file for complete search history.

(56) References Cited

U.S. PATENT DOCUMENTS

| 6,108,639 | A | 8/2000 | Walker et al. |
|---|---|---|---|
| 6,216,086 | B1 | 4/2001 | Seymour et al. |
| 6,332,126 | B1 | 12/2001 | Peirce et al. |
| 6,587,835 | B1 | 7/2003 | Treyz et al. |
| 6,592,033 | B2 | 7/2003 | Jennings et al. |
| 6,684,195 | B1 | 1/2004 | Deaton et al. |
| 6,711,408 | B1* | 3/2004 | Raith .................... H04W 36/32 340/988 |
| 6,868,393 | B1 | 3/2005 | Demsky et al. |

(Continued)

FOREIGN PATENT DOCUMENTS

| WO | 9922328 | 5/1999 |
|---|---|---|
| WO | 0137183 | 5/2001 |
| WO | 2009035469 | 3/2009 |

OTHER PUBLICATIONS

European Patent Application No. 07854595.1, Search Report, Dec. 16, 2010.

(Continued)

*Primary Examiner* — Ted Wang
(74) *Attorney, Agent, or Firm* — Greenberg Traurig LLP

(57) ABSTRACT

Systems and methods to track locations of a mobile device as a function of time and extract routes traversed by the mobile device, frequencies of the routes, and travel time periods of the routes. The route information is organized as a route dictionary. In response to an indication of a recently completed route, the information of the recently completed route is used in the route dictionary to look up a most likely route for the next trip and the predicted time of the next trip. Location-based data items are selected based on the predicted route for the next trip, sorted based on closeness to the route and affinity to the user of the mobile device for transmission to the mobile device. Top selected data items are scheduled to be transmitted to the mobile device in a time window before the predicted time of the next trip to avoid distracting the user (e.g., from driving) while the user is on the trip.

20 Claims, 10 Drawing Sheets

(56) References Cited

U.S. PATENT DOCUMENTS

| | | | |
|---|---|---|---|
| 6,957,074 B2 | 10/2005 | Wang et al. | |
| 7,107,226 B1 | 9/2006 | Cassidy et al. | |
| 7,107,227 B1 | 9/2006 | Bezos et al. | |
| 7,127,415 B1 | 10/2006 | Verchere | |
| 7,200,566 B1 | 4/2007 | Moore et al. | |
| 7,324,896 B1 | 1/2008 | Smith | |
| 7,546,202 B2 | 6/2009 | Oh | |
| 7,546,206 B1* | 6/2009 | Miller | G01C 21/00 701/120 |
| 7,805,317 B2 | 9/2010 | Khan et al. | |
| 8,116,972 B2 | 2/2012 | Klampfl et al. | |
| 8,117,041 B1 | 2/2012 | Khan et al. | |
| 8,175,908 B1 | 5/2012 | Anderson | |
| 8,401,786 B2 | 3/2013 | Poppen et al. | |
| 2001/0014868 A1 | 8/2001 | Herz et al. | |
| 2001/0049636 A1 | 12/2001 | Hudda et al. | |
| 2001/0056395 A1 | 12/2001 | Khan | |
| 2002/0026380 A1 | 2/2002 | Su | |
| 2002/0178070 A1 | 11/2002 | Leveridge | |
| 2002/0194069 A1 | 12/2002 | Thakur et al. | |
| 2003/0004743 A1 | 1/2003 | Callegari | |
| 2003/0065805 A1 | 4/2003 | Barnes, Jr. | |
| 2003/0083961 A1 | 5/2003 | Bezos et al. | |
| 2003/0177058 A1 | 9/2003 | Needham | |
| 2004/0064351 A1 | 4/2004 | Mikurak | |
| 2004/0162889 A1 | 8/2004 | Morris et al. | |
| 2005/0055281 A1 | 3/2005 | Williams | |
| 2005/0144111 A1 | 6/2005 | Manstein et al. | |
| 2005/0149385 A1 | 7/2005 | Trively | |
| 2005/0159974 A1 | 7/2005 | Moss et al. | |
| 2005/0187873 A1 | 8/2005 | Labrou et al. | |
| 2005/0199707 A1 | 9/2005 | Beck et al. | |
| 2006/0015414 A1 | 1/2006 | Congram et al. | |
| 2006/0143080 A1 | 6/2006 | Garg et al. | |
| 2006/0190348 A1 | 8/2006 | Ofer et al. | |
| 2006/0231611 A1 | 10/2006 | Chakiris et al. | |
| 2006/0287810 A1 | 12/2006 | Sadri et al. | |
| 2006/0293971 A1 | 12/2006 | Hunter et al. | |
| 2007/0061245 A1 | 3/2007 | Ramer et al. | |
| 2007/0150334 A1 | 6/2007 | Bergh et al. | |
| 2007/0150352 A1 | 6/2007 | Kelly-Frank et al. | |
| 2007/0192183 A1 | 8/2007 | Monaco et al. | |
| 2008/0021767 A1 | 1/2008 | Benson et al. | |
| 2008/0076451 A1 | 3/2008 | Sheha et al. | |
| 2008/0120022 A1 | 5/2008 | Hayot et al. | |
| 2008/0154694 A1 | 6/2008 | Litzow et al. | |
| 2008/0156873 A1 | 7/2008 | Wilhelm et al. | |
| 2008/0248815 A1 | 10/2008 | Busch | |
| 2008/0263035 A1 | 10/2008 | Episale et al. | |
| 2008/0300973 A1 | 12/2008 | DeWitt et al. | |
| 2008/0319843 A1 | 12/2008 | Moser et al. | |
| 2009/0076896 A1 | 3/2009 | DeWitt et al. | |
| 2009/0076925 A1 | 3/2009 | DeWitt et al. | |
| 2009/0176509 A1 | 7/2009 | Davis et al. | |
| 2009/0198666 A1 | 8/2009 | Winston et al. | |
| 2009/0208313 A1* | 8/2009 | Hayashi | G06Q 10/08 414/222.02 |
| 2010/0125406 A1 | 5/2010 | Prehofer | |
| 2010/0222078 A1 | 9/2010 | Tysowski | |
| 2010/0274680 A1 | 10/2010 | Carlson et al. | |
| 2010/0287103 A1 | 11/2010 | Mason | |
| 2010/0302056 A1 | 12/2010 | Dutton et al. | |
| 2010/0305855 A1 | 12/2010 | Dutton et al. | |
| 2010/0331016 A1 | 12/2010 | Dutton et al. | |
| 2011/0106429 A1 | 5/2011 | Poppen et al. | |
| 2011/0137551 A1 | 6/2011 | Peri | |
| 2011/0161136 A1 | 6/2011 | Faith et al. | |
| 2012/0215612 A1 | 8/2012 | Ramer et al. | |
| 2013/0151148 A1 | 6/2013 | Parundekar et al. | |
| 2013/0166586 A1 | 6/2013 | Pfeifle et al. | |
| 2014/0095071 A1 | 4/2014 | Srikanteswara et al. | |
| 2014/0136104 A1* | 5/2014 | Spears | G01C 21/3484 701/521 |
| 2014/0172576 A1 | 6/2014 | Spears et al. | |
| 2014/0213300 A1 | 7/2014 | Spears et al. | |
| 2014/0236678 A1 | 8/2014 | Akerman et al. | |
| 2014/0244353 A1 | 8/2014 | Winters | |

OTHER PUBLICATIONS

European Patent Application No. 07864052.1, Extended Search Report, Dec. 22, 2010.
International Patent Application PCT/US07/83946, International Search Report and Written Opinion, Mar. 4, 2008.
International Patent Application PCT/US07/83963, International Search Report and Written Opinion, Mar. 4, 2008.
International Patent Application PCT/US07/83973, International Search Report and Written Opinion, May 5, 2008.
International Patent Application PCT/US07/83983, International Search Report and Written Opinion, Mar. 28, 2008.

* cited by examiner

FIG. 2
| Route Dictionary 232 | | |
|---|---|---|
| Route A 401 | Frequency A 411 | Time Traveled A 421 |
| ⋮ | | ⋮ |
| Route X 403 | Frequency X 413 | Time Traveled X 423 |
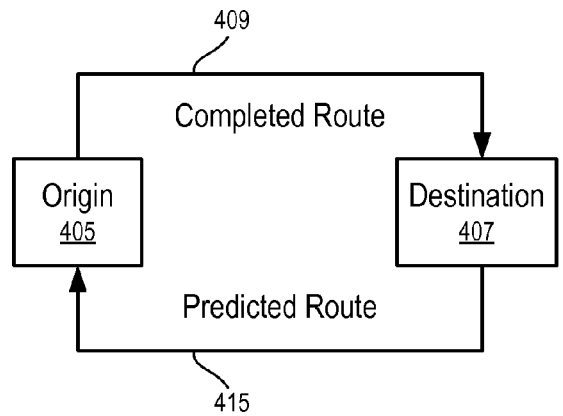
FIG. 3
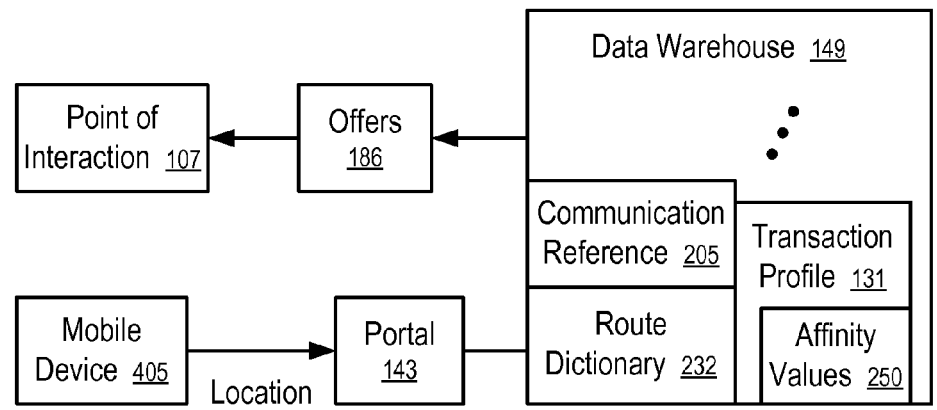
FIG. 4

US 9,332,396 B2

SYSTEMS AND METHODS TO PROVIDE LOCATION-DEPENDENT INFORMATION DURING AN OPTIMAL TIME PERIOD

RELATED APPLICATIONS

The present application claims priority to U.S. Pat. App. Ser. No. 61/954,316, filed Mar. 17, 2014, the entire disclosure of which application is hereby incorporated herein by reference.

The present application relates to U.S. Pat. App. Pub. No. 2014/0136104, entitled "Systems and Methods for Route Prediction", U.S. Pat. App. Pub. No. 2014/0172576, entitled "Systems and Methods to Select Locations of Interest", and U.S. Pat. App. Pub. No. 2014/0213300, entitled "Systems and Methods to Select Locations of Interest based on Distance from Route Points or Route Paths", the entire disclosures of which applications are incorporated herein by reference.

FIELD OF THE TECHNOLOGY

At least some embodiments disclosed herein relate to systems and methods configured to present location-based information in general and more particularly but not limited to optimizing timing for the presentation of the location-based information.

BACKGROUND

Recent developments in location determination technologies implemented in mobile devices allow the monitoring of the locations of the mobile devices of the users and thus the locations of the users. The locations of the users can be used to deliver location-based information to the users while the users are at or near points of interest.

For example, a location determination system may use a Global Positioning System (GPS), or a wireless communication system having a set of base stations or access points to serve nearby wireless communication devices, to determine in real time the location or approximate location of a mobile device, such as a mobile phone, a smart phone, a personal media player, a GPS receiver, etc. Thus, when the location of the mobile device indicates that the user of the mobile device is currently at a location of interest, a wireless communication connection can be used to deliver information relevant to the location to the mobile device and provide assistance to the user.

BRIEF DESCRIPTION OF THE DRAWINGS

The embodiments are illustrated by way of example and not limitation in the figures of the accompanying drawings in which like references indicate similar elements.

FIG. 2 illustrates a route dictionary according to one embodiment.

FIG. 3 illustrates a way to predict the route of a future trip according to one embodiment.

FIG. 4 shows a system to present offers according to one embodiment.

DETAILED DESCRIPTION

Location-based information provided to mobile devices based on the current locations of the mobile devices may be of great values to users in some applications, but may be too late in other situations.

For example, if a user is in a vehicle, transmitting information relevant to a location to the mobile device of the user while the user is at or near the location may provide insufficient time for the user to review the information and thus use the information.

One embodiment disclosed herein includes a system that tracks the real time location information of a mobile device to extract routes that have been traversed by the mobile device, organizes the route information in the form of a route dictionary, detects a recently completed route, uses information from the recently completed route in the route dictionary to look up a most likely route in the near future and the predicted time that the user will travel along the most likely route, selects location-based data items based on their closesness to the most likely route and the user affinity to the data items, and schedules the transmission of the selected data items in a time window prior to the predicted time that the user will start to travel along the most likely route. Thus, the transmission of the information can avoid distracting the user (e.g., while the user is driving) and provide sufficient time for the user to review and use the information.

Figure 1:
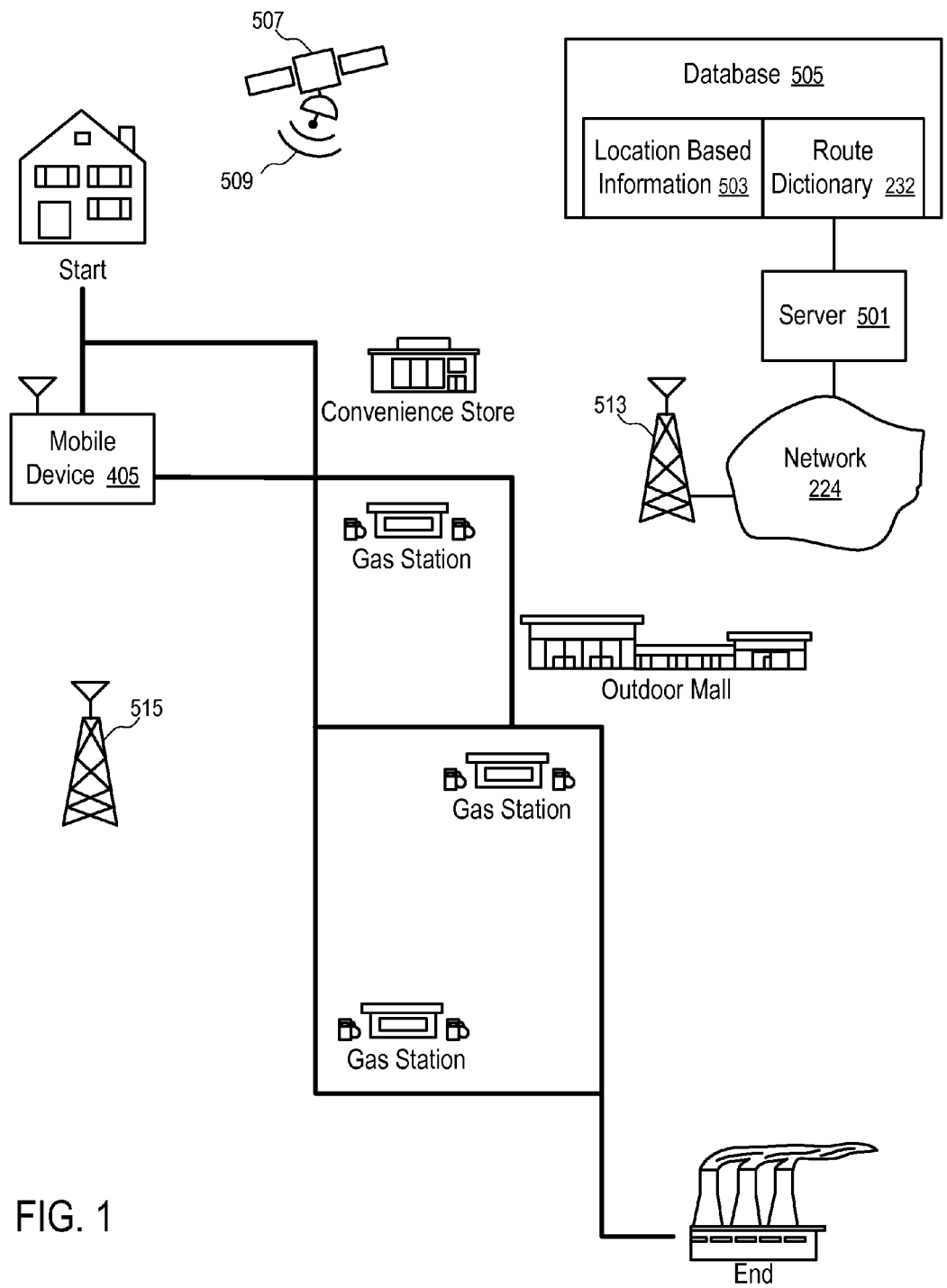
FIG. 1 shows a system configured to provide location-based information according to one embodiment.

FIG. 1 shows a system configured to provide location-based information according to one embodiment.

In FIG. 1, a mobile device (405) is configured to determine its real time location using a location determination system. For example, the mobile device (405) is in one embodiment configured with a Global Positioning System (GPS) receiver to receive GPS signals (509) from a set of GPS satellites (e.g., 507) to determine its real time location. In another example, the mobile device (405) is configured to communicate with the cellular communication base stations (513, ..., 515) to determine its real time location.

In FIG. 1, the mobile device (405) communicates the locations of the mobile device (405) as a function of time to a server (501). For example, the mobile device (405) of one embodiment communicates its real time location to the server (501) in real time via a wireless communication connection through a cellular communications base station (513) and a network (224). For example, the mobile device (405) of another embodiment records its location as a function of time in its memory and transmits the location data to the server (501) periodically, e.g., via the wireless communication connection through a cellular communications base station (513 or 515), or other connections.

In one embodiment, the server (501) (or a mobile application running in the mobile device (405)) filters the location data to identify sequences of locations that correspond to travel routes of the user. For example, when the locations of the user correspond to a movement along a road, a route of a public transportation line, a highway, etc., the locations can be identified as part of a travel route of the user. For example, when the locations of the user correspond to a movement around a point of interest, the locations may not be considered as a part of a travel route.

In one embodiment, a sequence of locations as a function of time is recognized as a travel route of the mobile device (405) when the sequence of locations as a function of time is in accordance with a pattern of traveling from one location to another. For example, when the time gap between two locations is consistent with a mode of transportation between the two locations, the locations are recognized as a part of a route traversed by the mobile device.

In FIG. 1, a travel route represented by a sequence of locations of the mobile device (405) as a function of time is reduced to a plurality of route segments that connect a plurality of route points. Each of the route points is assigned a unique identifier. A travel route is thus represented by a sequence of unique identifiers and stored in the database (505) as a route word in a route dictionary (232), similar to a word represented by a sequence of letters being stored in a dictionary.

In one embodiment, the route dictionary (232) further stores the term frequencies of the route words. A term frequency of a route word represents the frequency of the route being traversed by the mobile device (405).

In one embodiment, the route dictionary (232) further stores the time periods of the route words. A time period of a route words indicates the time period within a day during which the mobile device (405) is most likely to travel along the route.

In FIG. 1, the server (501) predicts the time period and the route of the next travel of the mobile device (405) based on the route that is recently traversed by the mobile device (405), uses the prediction to select location-based information (503), and schedules the location-based information (503) for delivery to the mobile device (405) a predetermined time period before the mobile device (405) starts to travel along the predicted route in accordance with the predicted time period of travel. Thus, the user of the mobile device (405) is provided with an optimal time window to review the information and arrange the travel using the information.

For example, the techniques can be used to deliver offers from merchants such that the users may use the offers during their next trips. For example, the route of a future trip of a user is predicted in one embodiment to allow the presentation of offers at an optimal time period during which the user may be preparing for the trip. The offers are selected based on the predicted route of the future trip, such that it is convenient for the user to visit the merchants relevant to the offers during the trip. The offers are selected further based on the interest of the user (e.g., the affinity of the user to the merchants).

For example, the offers can be selected based at least in part on affinity of the user to the respective merchants associated with the offers and based at least in part on the distance of the locations of the merchants from the predicted route of the trip. The affinity of the user to the merchants can be determined, for example, from the purchase/payment transactions of the user, to increase the likelihood that the user is interested in the offers. The time of the future trip is predicted based on the historic travel data of the user such that the offers can be presented to the user in a time window prior to the predicted trip, which allows the user to consider the offers without distracting the user during the trip (e.g., distraction from driving during the trip).

For example, the server (501) of one embodiment is configured to predict the route of a near future trip based on the current, or the most recent, completed trip. The destination of the completed trip is predicted as the origin of the near future trip; and the origin of the completed trip is predicted as the destination of the near future trip. The predicted origin and destination of the near future trip provide the route point identifications of the predicted route words in the route dictionary (232). The route words having the corresponding first and last route point identifications matching the route point identifications of the predicted origin and destination can be selected as route candidates. The term frequencies of the route candidates can be used to identify the most likely route word. Thus, the entire route of the near future trip of the user can be predicted from identifying the most likely route word according to the term frequencies of the route words in the route dictionary; and the time period of the predicted route word in the route dictionary indicates when the next trip will start.

In some embodiments, the destination of the completed trip is predicted as the origin of the near future trip, without assuming that the origin of the completed trip is the destination of the near future trip. A route dictionary of the user is then used to predict, using the route dictionary (232), the route, the destination, and the starting time of the new future trip.

In some embodiments, a route point closest to the current location of the user is predicted as the origin of the near future trip; and a route dictionary (232) of the user is then used to predict the destination, the route, and the starting time of the next trip.

In some embodiments, the destination of the completed trip is predicted as the origin of the near future trip, and the current location of the user is predicted as the origin of the near future trip; and a route dictionary (232) of the user is then used to predict the route, the destination, and the time of the new future trip.

In one embodiment, a route dictionary of the user is used to predict the near future trip based on assuming a time window of the trip, without assuming the origin and/or destination of the near future trip. For example, route candidates can be selected from the route dictionary (232) based on whether the time periods of the route are within a predetermined time window (e.g., next hour), without eliminating route candidates based on the identification of the first route point and/or the last route point in the route words. The route candidates can then be ranked according to their term frequencies in the route dictionary to select the most likely route.

Alternatively, the entire route of the near future trip may be predicted by reversing the entire route of the most recently completed trip, or using a route planner of a map system based on the predicted origin and destination of the near future trip. The time period of the route word corresponding to the predicted route is used to determine a time window to transmit the location-based information (503) to the mobile device (405).

The predicted route and time of the trip can be used to select and/or present offers along or near the route, based on utility scores of the offers that are a function of the closet to the route as well as most likely to be redeemed.

In one embodiment, the route dictionary (232) is used to predict the route segments of the next trip. The route dictionary identifies the travel frequency of the user on various routes and/or the time patterns of past trips. The predicted route segments identify the intermediate locations on the next trip between the origin and the destination; and the offers from merchants located on or near the route segments can be selected based on a measurement of closeness of the merchant locations to the route.

In one embodiment, a time window during which the user is most likely to take the next trip is also predicted using the route dictionary. Thus, offers selected based on the predicted route can be delivered to the user in an optimal time period during which the user is likely preparing for the trip and before the user starts to travel (e.g., within a predetermined time period prior to the predicted time window of the next trip).

In one embodiment, offer candidates are selected based on closeness to the route and ranked based on the utility scores of the offer candidates. The utility score indicates a magnitude of the utility of the offer to the user, based on a function of a distance between the merchant location of the offer and an affinity of the user to the merchant of the offer. The utility score increases as the affinity of the user increases and decreases as the distance between the merchant location and the travel route increases. One or more top ranked offer candidates can be selected for presentation to the user at a predetermined time prior to the next trip.

In one embodiment, a future trip is predicted based on the route dictionary. For example, based on the frequencies of past traveled routes and the timing of the past travels, the route of a future trip that will occur in a predetermined time period is.

For example, the route the user is likely to take in a future trip within a predetermined time period is determined from the route dictionary. The predicted route is used to select offers from merchants located on or near the route segments; and the utility scores of the selected offers can be ranked to select one or more top ranking candidates for presentation to the user the predetermined time period before the user starts the trip.

In one embodiment, the route dictionary not only tracks the route segments, but also tracks the time information of the travel on the route segments (e.g., hours within a day, days within a week). Thus, the route dictionary can be used to predict which route and/or segments the user is likely to travel in a given time period; and the prediction can be used to select offers based on the time period, the predicted route, the utility scores of the offers that are a function of closeness to the route as well as likeliness to be redeemed.

For example, the discount offers from merchants are selected and presented to the user before the travel starts, using a route dictionary that has past travel information. The timing of the travel can be predicted, in additional to the likely route segments. Thus, the discount offers from the merchants can be presented in an optimal time period prior to the trip, allowing the user to schedule time to visit the merchants during the trip.

When the user drives a car on the trip, presenting an offer during the trip may distract the user from driving. Presenting the offer shortly just before the trip will have best chance of influencing the user to stop by the merchant during the trip to take advantage of the offer.

In one embodiment, the destination and origin of the next trip is predicted based on the most recently completed trip; and the timing of the next trip and the route of the next trip is predicted using the route dictionary.

FIG. 2 illustrates a route dictionary according to one embodiment. In FIG. 2, the route dictionary (232) includes a list of routes (401, . . . , 403) of past trips of a user (101), the frequencies (411, . . . , 413) of the user (101) traveling along the routes (401, . . . , 403), and the times traveled (421, . . . , 423) (e.g., time windows within a day, week, and/or month).

In one embodiment, each route (e.g., 401) in the route dictionary (232) is identified by a string of symbols, wherein each symbol represents a predetermined location on the route. The same symbol in different routes represents the same location. For example, if a route goes through locations "A", "S", and "T", the route is identified by the string "AST", which is a "route word" identifying a route in the route dictionary (232). When each route is represented via a route word in the route dictionary (232), the routes (401, . . . , 403) may be sorted according to the route words in the route dictionary (232). The route dictionary (232) allows an efficient look-up of a route word starting with one or more known symbols.

When one or more first locations on a route are known, the one or more first locations represent a partial route word in the route dictionary (232); and the route words staring with the partial route word can be located in the route dictionary (232) efficiently and then sorted according to their respective term frequencies (e.g., 411) to identify the most likely route word, which identifies the most likely route that will be taken by the user (101) of the mobile device (405).

When the origin and/or the destination of the next trip is predicted, the route words starting and/or ending with the symbols corresponding to the predicated origin and/or the destination can be selected from the route dictionary (232) and sorted according to their frequencies (e.g., 411, 413) to select the most likely route word that identifies the predicted route. In one embodiment, to facilitate the look-up of route words having known destination locations, the route words in the route dictionary (232) is arranged such that the first symbol in a route word represents the destination of the route, the second symbol in the route word represents the origin of the route, and subsequent route words represent the subsequent locations on the route. Thus, the identification of the predicated route destination and origin provides the partial starting portion of a route word; and the route dictionary (232) can be used to efficiently look up the route words having the partial starting portion.

FIG. 3 illustrates a way to predict the route of a future trip according to one embodiment. In FIG. 3, when the most recent trip of the user (101) is found to be from the origin (405) to the destination (407), it can be predicted that the next trip of the user (101) is likely to have the origin at the previous destination (407), and the destination at the previous original (405). Thus, the predicted route (415) of the next trip can be determined from the route dictionary (232).

Alternatively, the complete route (409) may be reversed as the predicted route (415).

In one embodiment, a predicted route may use a known route point closest to the current location of the user (101) as the origin, or the previous destination (407) as the origin, in determining a most likely route of the next trip of the user (101) from the route dictionary (232).

FIG. 4 shows a system to present offers according to one embodiment. In FIG. 4, a mobile device (405) of the user (101) is configured to transmit its location information to the portal (143) of the server (501). Based on the location information received in the portal (143) over a period of time, a route dictionary (232) of the user (101) is generated and/or updated. The route dictionary (232) is used to predict the route of a future trip of the user (101).

Figure 11:
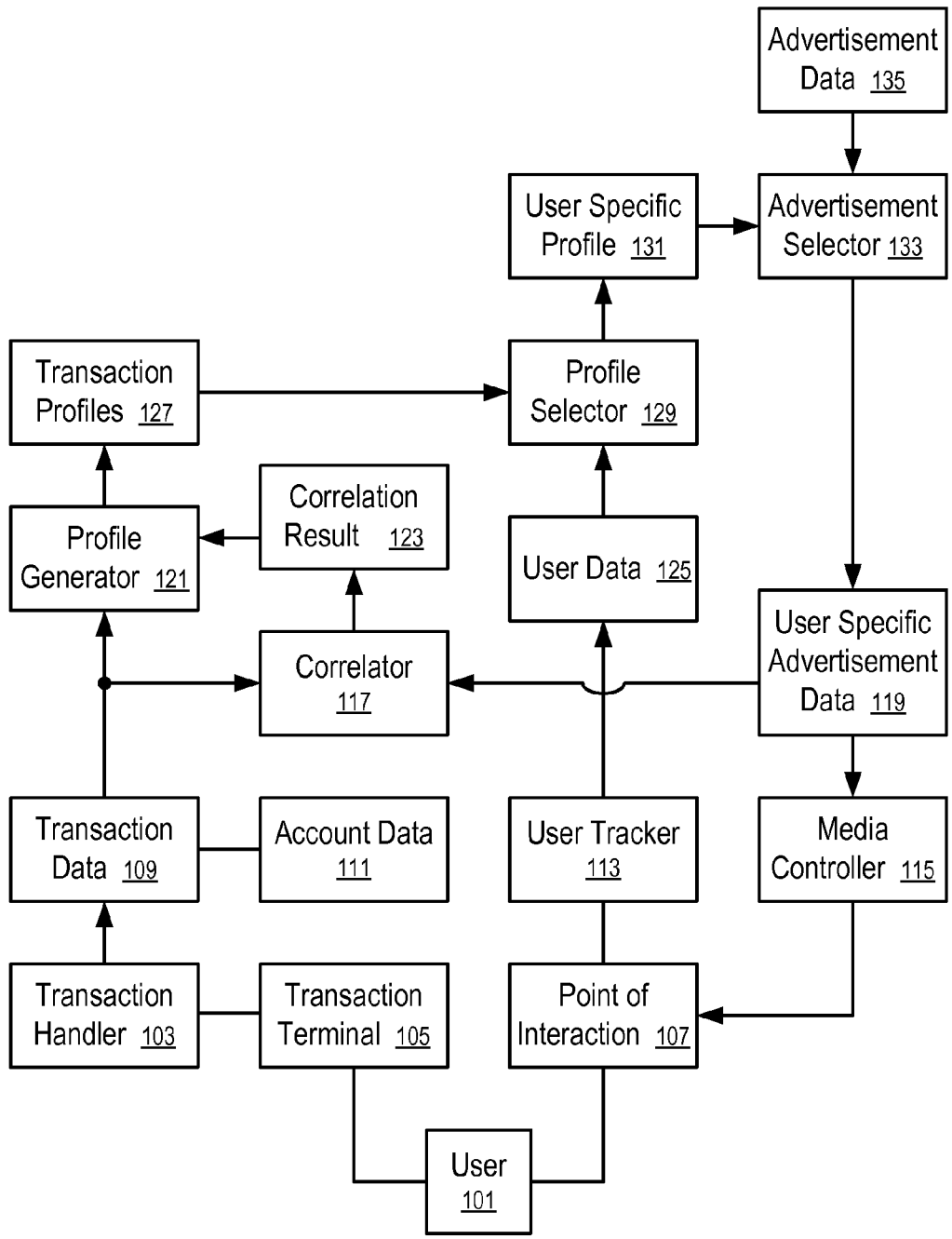
FIG. 11 illustrates a system to provide services based on transaction data according to one embodiment.

In one embodiment, the data warehouse (149) stores the route dictionary (232) and transaction data (109) of the user (101); and a profile generator (121) is configured to determine a transaction profile (131) of the user (101), as illustrated in FIG. 11. The transaction profile (131) includes affinity values (250) of the user (101), which indicates the merchant preference of the user (101). For example, if the user (101) has more payment transactions with a merchant (or high aggregated transaction amount) within a predetermined period of time (e.g., last 6 months, a year), the user (101) may have a high affinity value with the merchant.

In one embodiment, after a set of offers from merchants on or near the predicted route is identified, the utility scores of the offers are computed based on measurements of closeness from the respective merchant locations to the predicted route and the affinity scores of the user (101) with the respective merchants. The offers are ranked according to the utility scores of the offers; and one or more top ranked offers (186) are communicated to the point of interaction (107) of the user (101) identified by the communication reference (205) of the user (101), at a predetermined time before the user starts the trip.

In one embodiment, the computing apparatus has at least one microprocessor and memory storing instructions configured to instruct the at least one microprocessor to perform operations. The computing apparatus may include one or more of: a data warehouse (149) or the database (505); a transaction handler (103); a portal (143) to receive the location information to generate the route dictionary (232); and a profile generator (121) to generate the transaction profile (131) of the user (101), including the affinity values (250), each of which can be implemented using one or more data processing systems illustrated in FIG. 15.

In one embodiment, the computing apparatus includes a portal (143) of a server (501) to receive location data from a mobile device (405). The location data identifies locations of a mobile device at a plurality of different time instances. The portal (143) (and/or the server (501), or the mobile device (405)) extracts from the location data routes traversed by the mobile device, and generates route words representing the routes, where each of the route words has an ordered list of location identifiers, and each of the location identifiers represents a defined location in a route dictionary (232).

The computing apparatus further includes a data storage device (e.g., 505 or 149) configured to store the route words in the route dictionary (232), where for each respective route identified by a respective route word, the route dictionary (232) stores at least a frequency of the mobile device (405) traversing the respective route and a time period during which the mobile device (405) traverses the respective route in a day.

In response to the portal (143) receiving an indication of a recently completed route (409) of the mobile device, the portal is configured to look up a plurality of route words from the route dictionary using a location identifier of a destination (407) of the recently completed route (409), and/or a location identifier of the origin (405) of the recently completed route (409), where the destination (407) of the recently completed route (409) may be predicted as the origin of the predicted route (415) and/or the origin (405) of the recently completed route (409) may be predicted as the destination of the predicted route (415).

In one embodiment, the portal (143) selects a selected route word from the plurality of route words based at least in part on frequencies of the plurality of route words, determine ranks of a plurality of data items based at least in part on distances of locations of the data items to a route represented by the selected route word, and select one or more selected data items based on the ranks. The portal (143) then looks up from the route dictionary (232) a time period of the selected route word during which the mobile device traverses the route represented by the selected route word, and transmits the one or more selected data items to the mobile device a predetermined time period before a next trip of the mobile device traversing the route represented by the selected route word according to the time period of the selected route word.

In one embodiment, the ranks of the plurality of data items are further based on affinity of a user of the mobile device to the data items.

For example, the ranks of the plurality of data items can be determined via: determining a utility score for each of the data items; and sorting the data items according to the utility score. The utility score of each respective data item is a function of: a distance from a location of the respective data item to the route represented by the selected route word; and an affinity measurement of the user of the mobile device to the data item.

In one embodiment, the utility score of the respective data item decreases when the distance from the location of the respective data item to the route represented by the selected route word increases; and the utility score of the respective data item increases when the affinity measurement of the user of the mobile device to the data item increases.

The affinity measurement of the user of the mobile device to the data item is based on past data recording transactions between the user and a merchant of the data item.

Route Prediction

Figure 5:
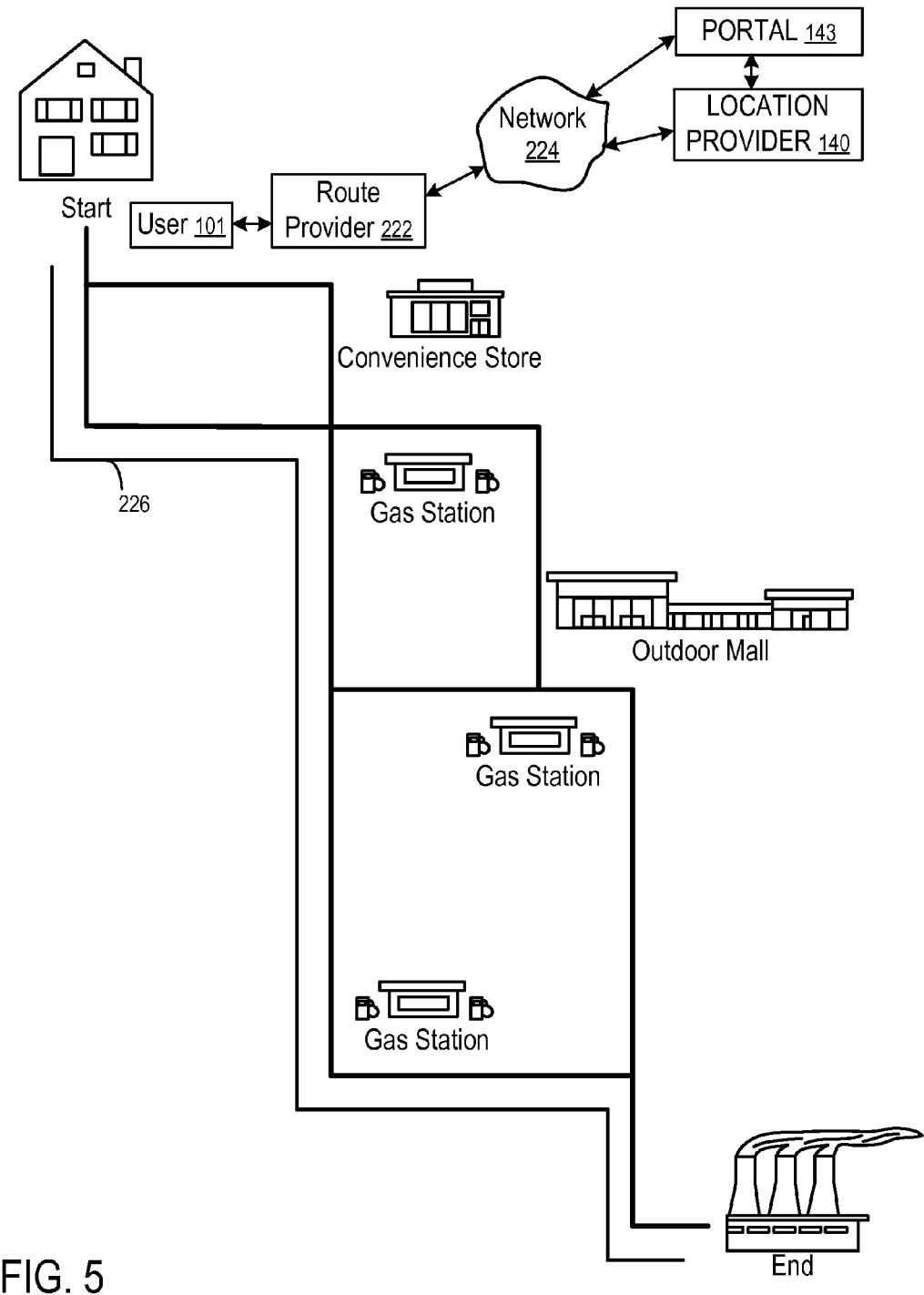
FIG. 5 shows a schematic diagram wherein a location provider interacts with a route provider associated with a user in accordance with an embodiment.

FIG. 5 shows a schematic diagram wherein a location provider (140) that interacts with a route provider (222) associated with a user (101). In an embodiment the likely route that will be traversed by the user (101) can be predicted by a route predictor (230) associated with the location provider (140). The route predictor (230) can obtain information from the route provider (222) such as an origin/start point or portion of a route traversed by the user (101) to predict the likely route of the user (101). In an embodiment, the route predictor (230) can consult a route dictionary (232) associated with the user (101) in order to make the route prediction. For example, the route predictor (230) can predict that the route (226) will likely be taken by the user (101) based on the start point or origin and the information that the user (101) traversed the first two segments of the route (226).

In an embodiment, the location provider (140) obtains the information regarding a route selected (226) for traversal by the user (101) from the route provider (222) via a communication network (224). In an embodiment, the route provider (222) can include any equipment that provides GPS data of the user, such as, a GPS device or a smartphone or a device which includes an IP address that may be mapped to the user's location. Accordingly, a route selected (226) for traversal by the user (101) is obtained by the location provider (140) which in conjunction with data from the user specific profile (131) can predict the likely locations that are of interest (144) to the user (101) along the selected route (226) and within a predetermined distance from the selected route (226). In an embodiment, the locations of interest (144) can include retail outlets, entertainment establishments or other locations where the user (101) is likely to spend time. Consequently, real time messages associated with such locations of interest (144) can be provided to the user by the portal (143) in accordance with embodiments that will be described in further detail herein. This facilitates the portal (143) to provide location-based services such as, real-time messages related to deals, coupons or other alerts to the user (101) that are tailored to the user's (101) interests.

Figure 6:
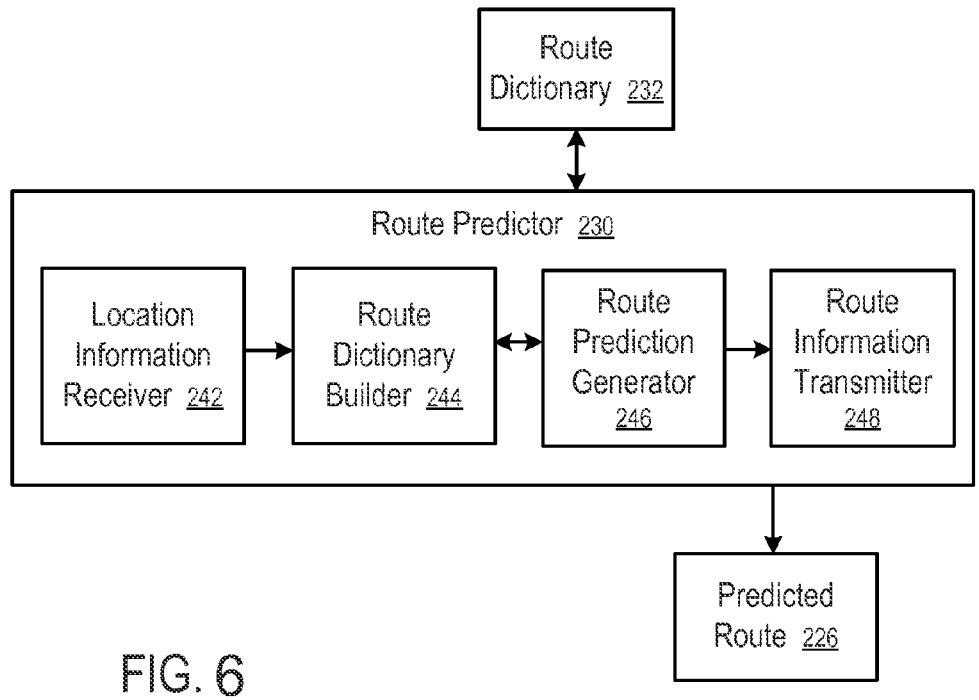
FIG. 6 shows a schematic diagram of a route predictor in accordance with an embodiment.

FIG. 6 shows a schematic diagram of a route predictor (230) in accordance with an embodiment. The route predictor (230) is configured to predict a route (226) that a user (101) will likely employ and communicate the predicted route (226) to the portal (143). In an embodiment, the route predictor (230) includes a location information receiver (242), a route dictionary builder (244), a route prediction generator (246) and a location information transmitter (248). The location information receiver (242) is configured to receive location information of consumers associated with the consumer accounts. In an embodiment, the location information receiver (242) can receive the GPS information or other network information, indicative of location of the consumers. In one embodiment, a consumer or a user (101) can be solicited to provide access to their current location information in order to receive location-based services. For example, when a user (101) consents to collection of his or her current location information, the user (101) can be requested to provide their mobile number or other information that can aid collection of current location information. This enables obtaining current location information from the consumer's mobile phone and location-based services appropriate to the consumer's location and context can be provided. In an embodiment, the location information receiver (242) can receive location information of a user's starting location and/or an initial portion of the route traversed by the user (101) to facilitate generating the route prediction.

The current location information collected by the location information receiver (242) is provided to a route dictionary builder (244) that builds and updates a database or a dictionary (232) of a user's routes wherein each route is coded into a collection of identifiers such as, letters which form a term or a word in the route dictionary (232). In an embodiment, the contents of the route dictionary (232) are accessed by the route prediction generator (246) to predict a route (226) that is likely to be traveled by the user (101). This is facilitated by employing language processing techniques to analyze contents of the route dictionary (232) for the route prediction (226). In an embodiment, context data which can also be recorded in the route dictionary (232) can be employed for the route prediction (226). In an embodiment, context data from external sources (not shown) in conjunction with the route dictionary (232) contents can also be employed for making route prediction. The route selected by the route prediction generator (246) is provided to a route information transmitter (248) which transmits the route prediction (226) to a requestor. In an embodiment, the requestor can be the portal (143) which is configured to provide location-based services. In an embodiment, the requestor can be a third-party requestor, such as, a merchant or another intermediate entity that logs request for the route prediction.

Figure 7:
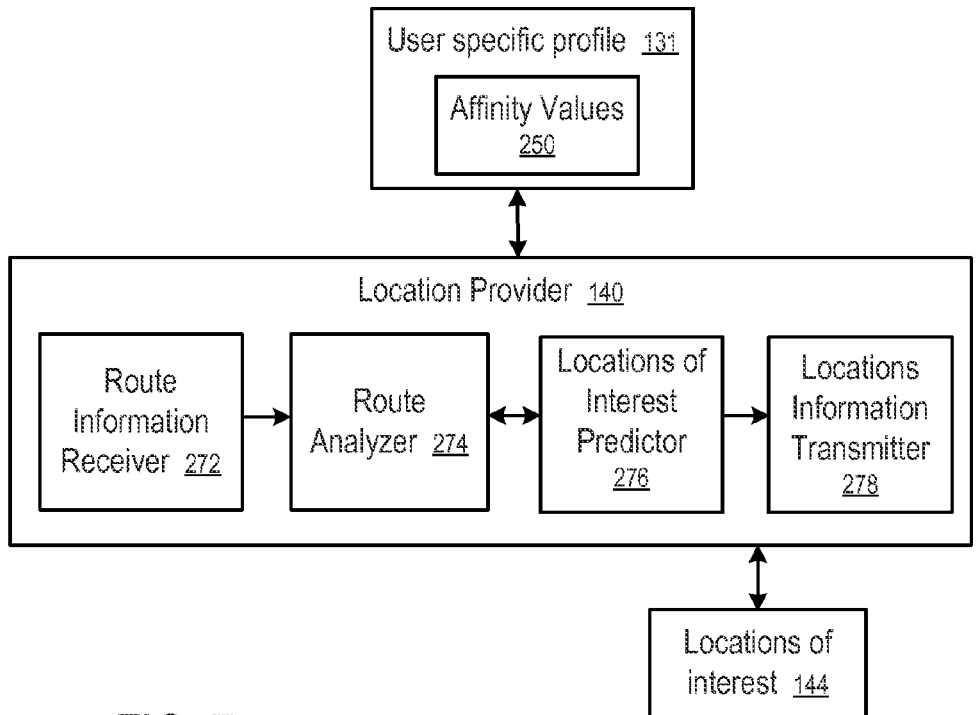
FIG. 7 shows a schematic diagram of a location provider in accordance with an embodiment.

FIG. 7 shows a schematic diagram of a location provider (140) in accordance with an embodiment. The location provider (140) is configured to determine locations (144) along the route (226) that will likely be of interest to the user (101) and provide information related to the locations of interest (144) to the portal (143). In an embodiment, the location provider (140) includes a route information receiver (272), a route analyzer (274), a location predictor (276) and a location information transmitter (278). The route information receiver (272) is configured to receive selected route information of consumers associated with the consumer accounts. In an embodiment, the route information receiver (272) can receive the GPS information or other network information, indicative of current location and a selected route of the consumers. In one embodiment, a consumer or a user (101) can be solicited to provide access to their current location information in order to receive location-based services. For example, when a user (101) consents to collection of his or her current location information, the user (101) can be requested to provide their mobile number or other information that can aid collection of the current location information. This enables obtaining the current location and a selected route (226) or predicting that the route (226) will likely be selected from data provided by the consumer's or user's (101) mobile phone and location-based services appropriate to the user's location (101) and context can be provided. In an embodiment, the route information receiver (272) can receive selected route information (226) of the user (101) to facilitate determining the locations of interest (144) to the user (101) along the selected route (226).

The selected route information (226) collected by the route information receiver (272) is provided to a route analyzer (274) which analyzes the selected route in accordance with embodiments described herein. The results of the selected route analysis are transmitted to a locations of interest predictor (276) which is also included in the location provider (140). The locations of interest predictor (276) can additionally receive profile information (131) of the user (101) from the portal (143) and generates predictions or determines locations of interest (144) to the user (101) along the user's (101) selected route (226).

In an embodiment, the profile information (131) of the user (101) includes the affinity values (250) of the user (101) for various merchants, vendors, products and/or locations. In this embodiment, a computing apparatus can perform cluster analysis in accordance with techniques know in the art to identify a plurality of standardized clusters corresponding to an area of products or services based on transactions processed by the transaction handler. In an embodiment, each of the plurality of standardized clusters corresponds to a cluster of account holders, such as user (101), that have similar spending patterns. Thus, a set of affinity values (250) can be computed for the user (101) based on transaction data of the user (101) to indicate closeness or predilection of the user (101) to the set of standardized clusters. For example, if the user (101) buys a lot of electronics, the affinity value of the consumer for the electronics cluster and for a cluster of other users who have similar buying patterns is high. By the way of illustration and not limitation, the affinity values can be represented in as a range from 0 (representing least affinity) to 1 (representing high affinity) in accordance with an embodiment.

In an embodiment, the locations of interest (144) can be determined based not only on their distances from the route (226) but also based on the user affinity values (250). In accordance with embodiments described further herein, the distances of locations along the route (226) can be further weighed with the user affinity values (250) to derive particular utility values associated with each of the locations of interest (144), which utility values can be employed to further filter or grade the locations of interest (144) and thereby promote particular offers via real-time messaging to the user (101).

The locations information transmitter (278) receives the information regarding the locations that are likely to be of interest to the user (101) along the selected route from the locations of interest predictor (276) and transmits the received information to the portal (143) to aid the portal (143) in providing appropriate location-based services to the user (101).

Figure 8:
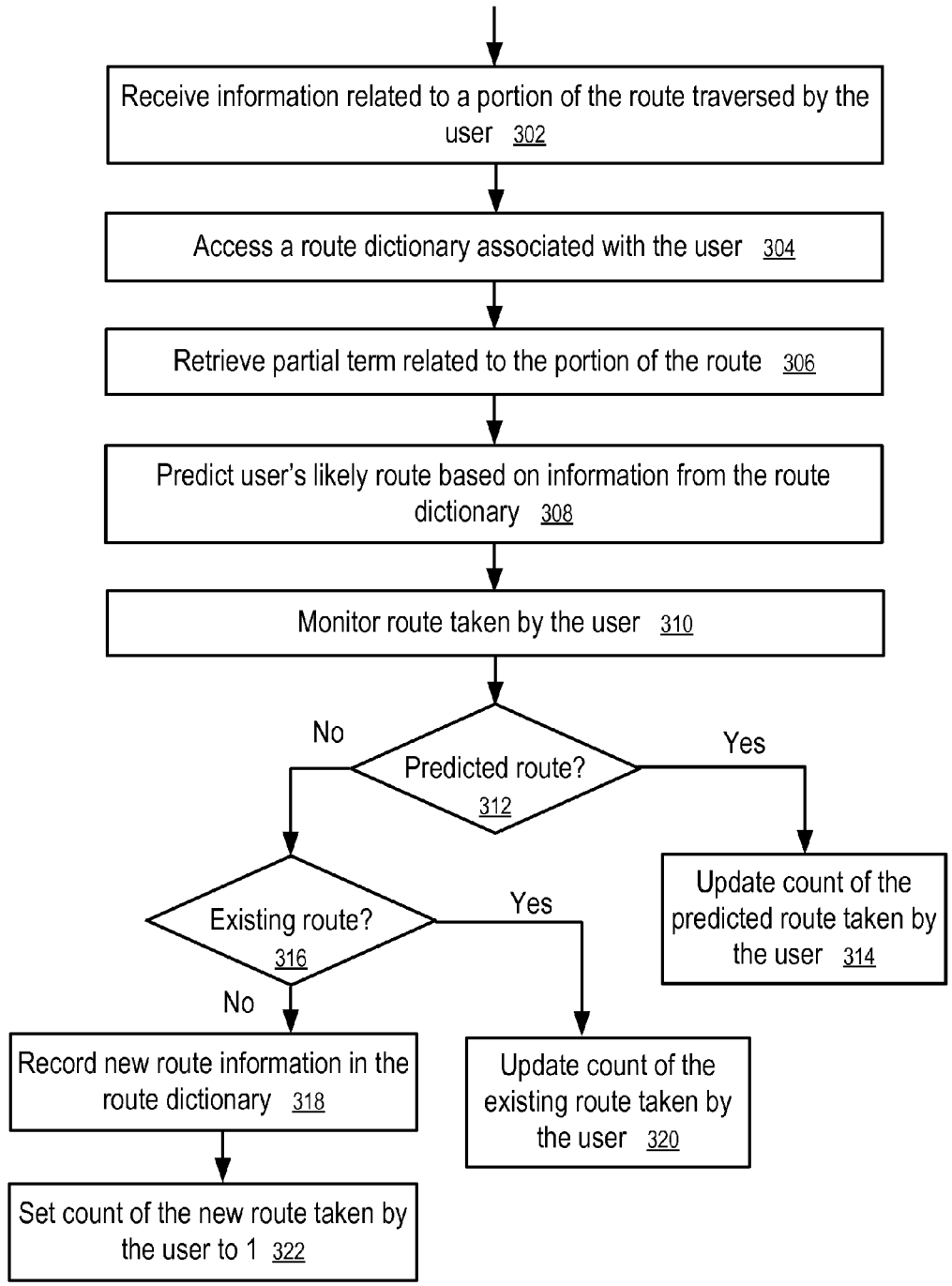
FIG. 8 shows a method of predicting a route and updating the route dictionary.

FIG. 8 shows a method of predicting a route and updating the route dictionary (232) by a computing apparatus according to one embodiment. Initially, a portion of the route traversed by the user (101) is received (302). A route dictionary (232) associated with the user is accessed (304) and a partial term that encodes the portion of the route traversed by the user is retrieved (306). The user's (101) likely route (226) is predicted (308) based at least on the partial term which indicates a portion of the route already traversed by the user (101). In a further embodiment the route dictionary (232) can be updated by observing and recording user behavior. Thus, the computing apparatus that is configured to provide route prediction (226) can be further configured to update the route dictionary (232) by monitoring the actual route traversed by the user (101) and recording the accuracy of the route prediction. In one embodiment, the route traversed by the user (101) is monitored (310) by the computing apparatus. In an embodiment, the computing apparatus updates the route dictionary (232) with the route taken by the user (101) at a later time according to the procedure detailed herein. The computing apparatus determines (312) if the user (101) employed the predicted route (226). If it is determined that the user (101) employed the predicted route (226), the count of the predicted route (226) is updated (314). If it is determined that the user (101) did not employ the predicted route (226), then a determination is further made (316) if the user (101) traversed a route already recorded or currently existing in the route dictionary (232). If the route traversed by the user already exists in the route dictionary (232), the count of the existing route is updated (320). If the route taken by the user (101) does not exist in the route dictionary (232), the new route information is recorded (318) in the route dictionary (232) with the frequency count set to 1 (322). Subsequently, as the user (101) employs the newly recorded route, its frequency count in the route dictionary (232) can be updated accordingly. In an embodiment, if a route is not used for longer than a preset threshold time, the route can be deleted from the route dictionary (232) thereby optimizing usage of resources and the route prediction process. The computing apparatus can therefore be configured to not only predict routes but also to observe the accuracy of route predictions and learn from them so that the accuracy of the route predictions can be increased with increasing observations regarding user behavior.

Details and examples in one embodiment regarding the prediction of subsequent route segments are provided in U.S. Pat. App. Pub. No. 2014/0136104, entitled "Systems and Methods for Route Prediction", the entire disclosure of which is hereby incorporated herein by reference.

Utility Score

Figure 9:
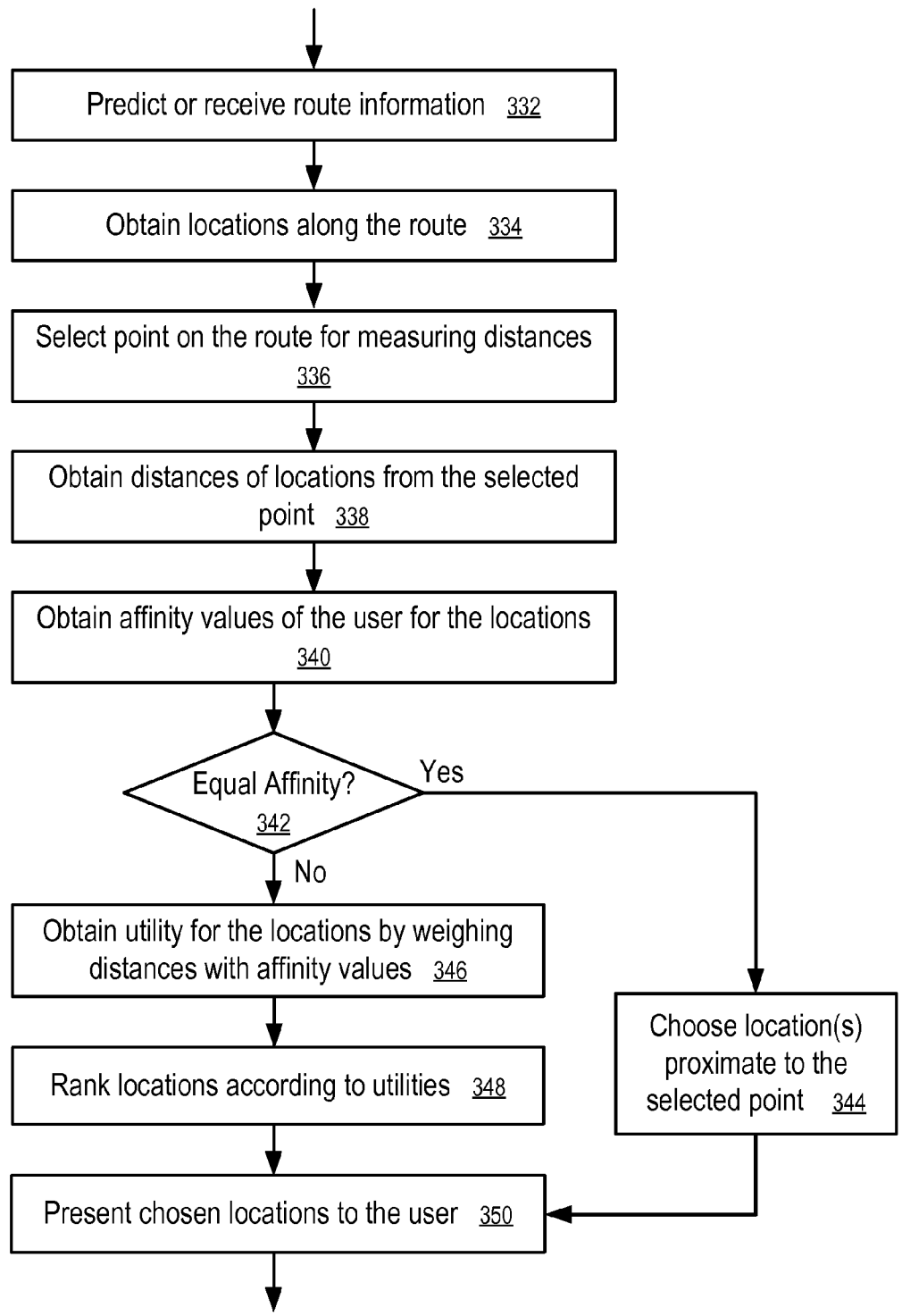
FIG. 9 shows a flow chart that details a method of determining the locations of interest to the user in accordance with one embodiment.

FIG. 9 shows a flow chart that details a method of determining the locations of interest (144) to the user (101) along the route (226) taking into consideration the affinities that the user (101) has for particular merchants/locations. The method begins with generation (332) of a prediction regarding the user's (101) likely route (226) or reception of information regarding a selected route (226) of the user (101). In operation (334), the locations, merchants and/or offers along the user's (101) route (226) are obtained. In an embodiment, all the merchants, locations or offers can be selected. In an embodiment, the merchants/locations/offers can be filtered at (334) based on general context data such as, date, day of the week or time of the day, particulars of the offers or user-specific context data such as profile information. In operation (336) a point is selected for measuring the distances of the locations and in operation (338) the distances of the locations are measured from the selected point. In an embodiment, the selected point is the starting point of the route or the origin and the distances are determined from the origin. In an embodiment the distances of the locations are determined from the destination, wherein the destination can be selected or predicted in accordance with embodiments describe herein. The point from which the distances are measured can be selected depending on various user-specific and/or route-specific factors such as proximity of the user (101) to the origin, user habits such as user providing reviews for a particular location. For example, if the user (101) has travelled past the mid-way point of the route (226) then offers/locations closer to the destination might be selected. In operation (340), the affinity values of the user for each of the locations are retrieved. If the affinity values are not readily available, they can be determined from other user specific profile information (131). As discussed herein, the affinity values can be represented as numbers within a certain range, for example from 0 to 1, with zero (0) representing the least affinity of the user for a given location, merchant, offer or combinations thereof and one (1) representing the highest affinity of the user for a given location, merchant, offer or combinations thereof.

In operation (342), the affinity values determined in operation (340) are compared. If it is concluded in operation (342) that the user (101) has equal affinity for all the locations for which the affinity values are obtained, then locations that are proximate to the selected point or within a certain predefined threshold distance from the selected point are chosen in operation (344). For example, all the locations within a certain threshold distance can be selected in operation (344) in an embodiment. In an embodiment, the locations can be ranked in an ascending order of their distances to the selected point and the top N locations (N being a natural number) can be selected in operation (344) as locations that are proximate to the selected point and presented to the user (101) in operation (350). In an embodiment, location-based services are associated with the locations/merchants that are presented to the user in operation (350).

If in operation (342), it is determined that different locations have different affinities for the user (101), a utility for each location is obtained in operation (346) by weighing the affinities of each of the locations with the distance of the locations from the selected point. By the way of a non-limiting embodiment, utility can be calculated as a product of the affinity with an inverse of the distance obtained in operation (338). In operation (348), the locations are ranked by their utility, for example, in a descending order of their respective utilities and the location with highest utility is selected for presentation the user in operation (350) in accordance with an embodiment. In another embodiment, the top N locations (N being a natural number) with the highest utility values are selected for presentation to the user (101) so that the user (101) may further choose any of the presented offers/locations.

Figure 10:
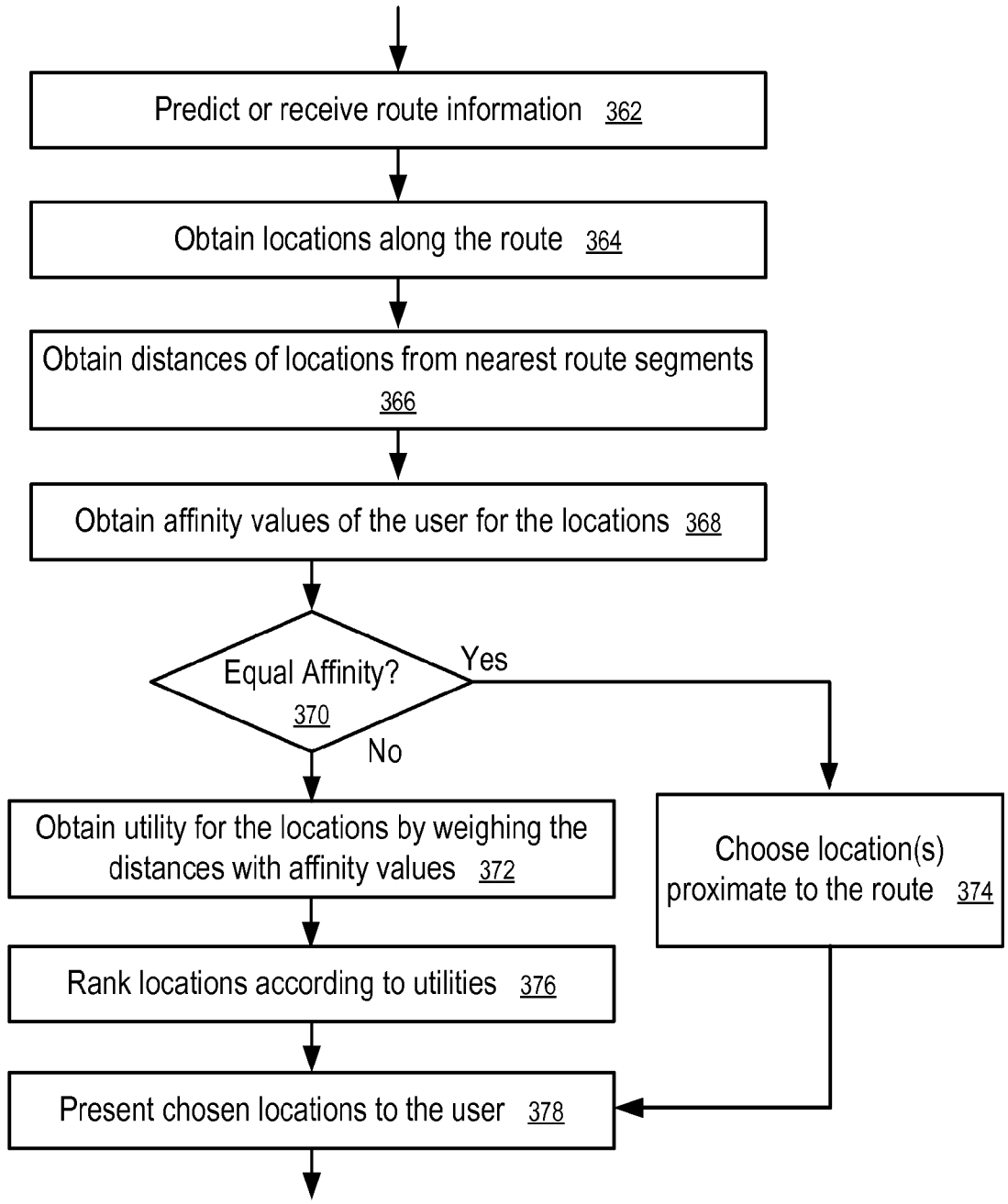
FIG. 10 shows a flow chart that details a method of determining the locations of interest to the user in accordance with one embodiment.

FIG. 10 shows a flow chart that details a method of determining the locations (144) that are of interest to the user (101) along the route (226) and proximate to the route, or more particularly, the route segments, taking into consideration the affinities that the user (101) has for particular merchants/locations. The method begins in operation (362) with generation of a prediction regarding the user's (101) likely route (226) or reception of information regarding a selected route (226) of the user (101). In operation (364), the locations, merchants and/or offers along the user's (101) route (226) are obtained in accordance to embodiments detailed supra. In an embodiment, all the merchants, locations or offers can be selected. In an embodiment, the merchants/locations/offers can be filtered in operation (364) based on general context data such as, date, day of the week or time of the day, particulars of the offers or user-specific context data such as profile information. In operation (366), the distances of the locations obtained in operation (364) are measured from the route (226) or more particularly, the distances of the locations are measured from the segments of the route (226) that are closest to such locations. In operation (368), the affinity values of the user (101) for each of the locations are retrieved. If the affinity values are not readily available, they can be determined from other user specific profile information (131). In an embodiment, the affinity values can be represented as numbers within a certain range, for example from 0 to 1, with zero (0) representing the least affinity of the user for a given location, merchant, offer or combinations thereof and one (1) representing the highest affinity of the user for a given location, merchant, offer or combinations thereof.

In operation (370), the affinity values determined in operation (368) for different locations, offers or merchants are compared. If it is determined in operation (370) that the user (101) has equal affinity for all the locations for which the affinity values were obtained, then locations that are proximate to the route (226) are chosen in operation (374). In an embodiment, the locations within a predefined threshold distance of their respective route segments can be selected in operation (374) as being proximate to the route (226). In an embodiment, the locations can be ranked in an ascending order of their distances to their respective route segments so that the top N locations (N being a natural number) can be selected in operation (374) and presented to the user (101) in operation (378). In an embodiment, location-based services are associated with the locations/merchants that are presented to the user in operation (378).

If in operation (370), it is determined that different locations have different affinities for the user (101), a utility for each location is obtained in operation (372) by weighing the affinities of each of the locations with the distance of the locations from their respective route segments. By the way of a non-limiting embodiment, utility of a location can be calculated as a product of its affinity with an inverse of the distance obtained in operation (366). In operation (376), the locations are ranked for example, in a descending order of their respective utilities, and the location(s) with highest utility is selected for presentation the user in operation (378) in accordance with an embodiment. In another embodiment, the top N locations (N being a natural number) with the highest utility values are selected for presentation to the user (101) so that the user (101) may further choose any of the presented offers/locations.

Details and examples in one embodiment regarding the selection of targeted offers based on a measure of distances to routes and user affinity to merchants are provided in U.S. Pat. App. Pub. No. 2014/0213300, entitled "Systems and Methods to Select Locations of Interest based on Distance from Route Points or Route Paths", the entire disclosure of which is hereby incorporated herein by reference.

Transaction-Based Offers

The techniques discussed above can be used in the delivery of location-based offers that are selected based on the transaction data of the users.

The transaction data, such as records of transactions made via credit accounts, debit accounts, prepaid accounts, bank accounts, stored value accounts and the like, can be further processed to optionally provide information for various services, such as reporting, benchmarking, advertising, content or offer selection, customization, personalization, prioritization, offer redemption, loyalty benefit provisioning and/or redemption, etc.

In one embodiment of improving privacy protections, users are required to enroll in a service program and provide consent to allow the system to use related transaction data and/or other data for the related services, and the system is configured to provide the services while protecting the privacy of the users in accordance with the enrollment agreement and user consent.

For example, based on the transaction data, an advertising network in one embodiment is provided to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. Some examples of targeted offer delivery are provided in U.S. Pat. No. 8,606,630, entitled "Systems and Methods to Deliver Targeted Advertisements to Audience", the entire disclosure of which is hereby incorporated herein by reference.

For example, the computing apparatus can be configured to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided U.S. Pat. Nos. 8,359,274 and 8,407,148, both entitled "Systems and Methods to Provide Messages in Real-Time with Transaction Processing", the entire disclosures of which are hereby incorporated herein by reference.

For example, the computing apparatus can be programmable for real-time interaction with users to provide messages and/or offers, validate fulfillment conditions, and provide benefits to qualified users to fulfill the offers. In one embodiment, the computing apparatus is configured to be programmed via accepting definitions of independent events and linking the events via prerequisite requirements to specify qualification conditions. The linked events form a flow or network of events; and user progress in the flow or network of events is tracked. The operations for each event are performed in an atomic way to allow the user positions in the flow or network of events to be identified as being in between adjacent events in the network. As a result, the programming of the real-time interaction, including the offer rules and messages, can be easily modified during the execution of the programming. Details in one embodiment regarding the formulation and management of real-time interaction are provided in U.S. Pat. App. Pub. No. 2012/0078697, entitled "Systems and Methods to Program Operations for Interaction with Users", the entire disclosure of which application is hereby incorporated herein by reference.

In one embodiment, a computing apparatus is configured to predict a route that a user is likely to travel before the user starts the trip. One or more offers can be selected based on the predicted route of the future trip and presented to the user prior to the trip. Presenting the offer at an optimal time prior to the trip allows the user to consider the offer without distracting the user from the trip (e.g., distracting the user from driving while on the trip).

FIG. 11 illustrates a system to provide services based on transaction data according to one embodiment. In FIG. 11, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 11, the system further includes a correlator (117) to correlate user specific advertisement data (119) with transactions resulting from the user specific advertisement data (119). The correlation results (123) can be used by the profile generator (121) to improve the transaction profiles (127).

The transaction profiles (127) of one embodiment are generated from the transaction data (109). For example, an aggregated spending profile is generated via the factor analysis and cluster analysis to summarize the spending patterns/behaviors reflected in the transaction records.

Figure 12:
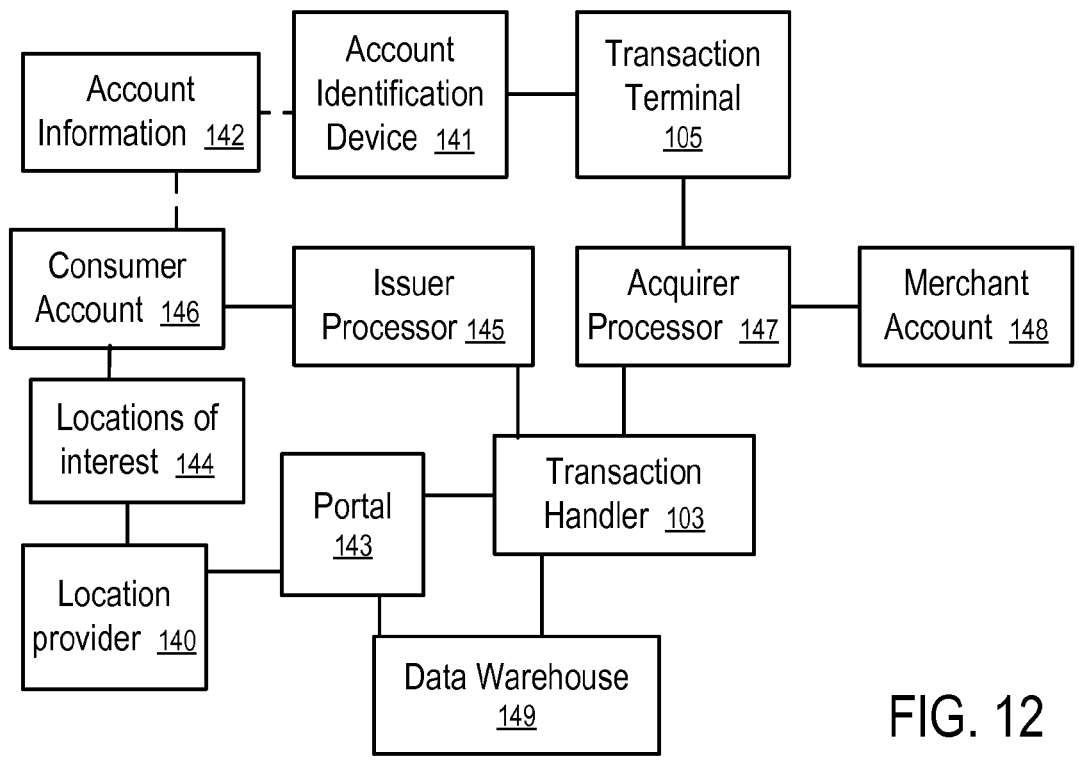
FIG. 12 shows a system to provide information based on transaction data according to one embodiment.

In one embodiment, a data warehouse (149) as illustrated in FIG. 12 is coupled with the transaction handler (103) to store the transaction data (109) and other data, such as account data (111), transaction profiles (127) and correlation results (123). In FIG. 12, a portal (143) is coupled with the data warehouse (149) to provide data or information derived from the transaction data (109), in response to a query request from a third party or as an alert or notification message.

In FIG. 12, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 13:
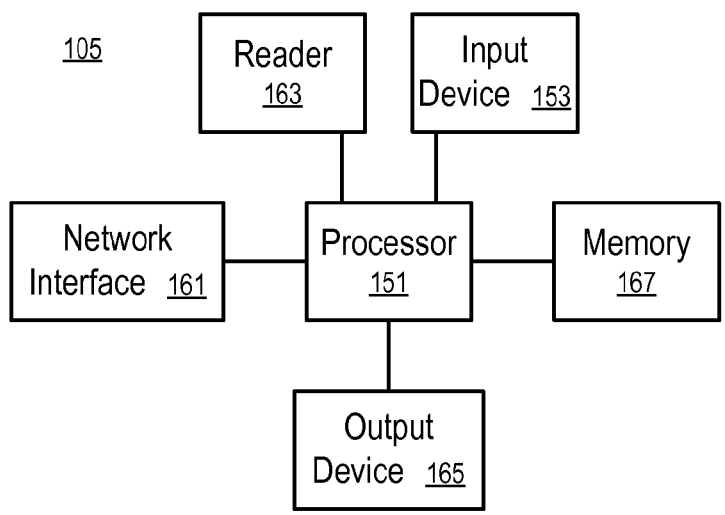
FIG. 13 illustrates a transaction terminal according to one embodiment.
Figure 14:
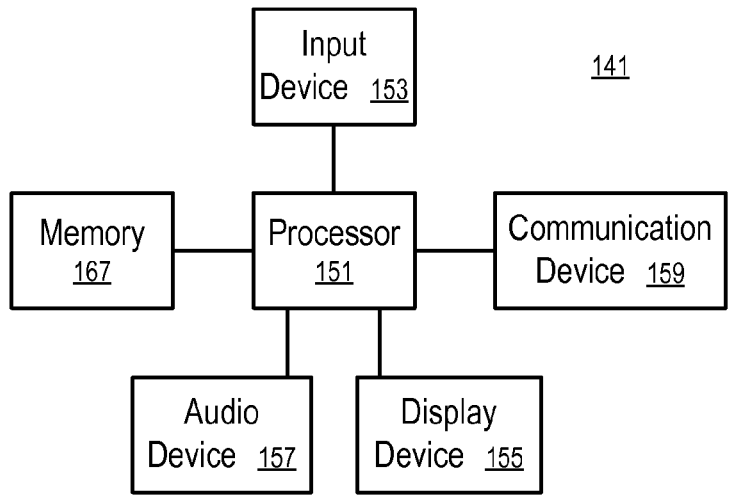
FIG. 14 illustrates an account identifying device according to one embodiment.
Figure 15:
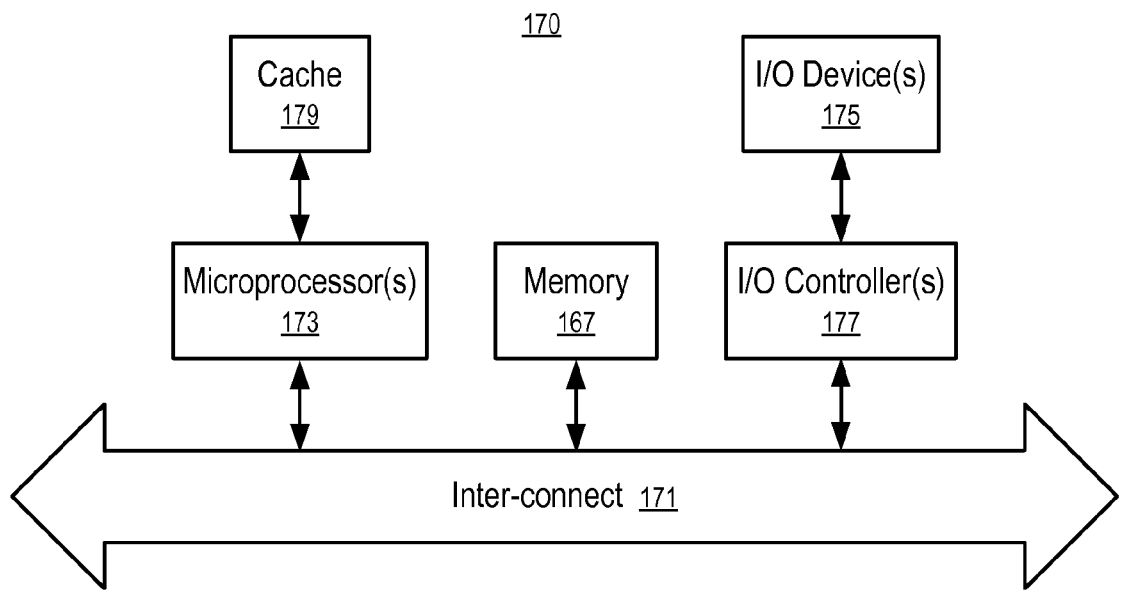
FIG. 15 illustrates a data processing system according to one embodiment.

FIGS. 13 and 14 illustrate examples of transaction terminals (105) and account identification devices (141). FIG. 15 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 11-15, and other figures, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

In FIG. 11, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) (and/or the portal (143)) is configured to provide at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The profile generator (121) may generate and update the transaction profiles (127) in batch mode periodically, or generates the transaction profiles (127) in real time, or just in time, in response to a request received in the portal (143) for such profiles.

The transaction profiles (127) of one embodiment include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

In one embodiment, the characteristics of transaction patterns of customers are profiled via clusters, factors, and/or categories of purchases. Further details and examples in one embodiment are provided in U.S. Pat. App. Pub. No. 2010/0306032, entitled "Systems and Methods to Summarize Transaction Data", and U.S. Pat. App. Pub. No. 2010/0306029, entitled "Cardholder Clusters".

In one embodiment, a set of profiles are generated from the transaction data for a plurality of geographical regions, such as mutually exclusive, non-overlapping regions defined by postal codes. Transactions of account holders residing in the regions are aggregated according to merchant categories for the respective regions and subsequently normalized to obtain preference indicators that reveal the spending preferences of the account holders in the respective regions. Each of the profiles for respective regions is based on a plurality of different account holders and/or households to avoid revealing private information about individual account holders or families. Further, the profiles are constructed in a way to make it impossible to reverse calculate the transaction amounts. Further details and examples about profiles constructed for regions in one embodiment are provided in U.S. Pat. App. Pub. No. 2013/0124263, entitled "Systems and Methods to Summarize Transaction data," the disclosure of which is hereby incorporated herein by reference.

Variations

Some embodiments use more or fewer components than those illustrated in the figures.

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

In one embodiment, the products and/or services purchased by the user (101) are also identified by the information transmitted from the merchants or service providers.

In one embodiment, the entity operating the transaction handler (103) provides the intelligence information in real time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

Transaction Processing and Data

FIG. 12 shows a system to provide information and/or services based on transaction data (109) according to one embodiment.

In FIG. 12, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records, such as the transaction profiles (127), aggregated spending profile, offer redemption notification, etc. The portal (143) may be implemented as a web portal, a telephone gateway, a file/data server, etc.

In FIG. 12, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 12, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 12, the transaction handler (103) uses the data warehouse (149) to store the records about the transactions, such as the transaction records or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 12, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 12, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records, such as merchant category, transaction date, amount, etc. Examples and techniques in one embodiment are provided in U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, and entitled "Merchant Benchmarking Tool," the disclosure of which application is hereby incorporated herein by reference.

Transaction Terminal

FIG. 13 illustrates a transaction terminal according to one embodiment. The transaction terminal (105) illustrated in FIG. 13 can be used in various systems discussed in connection with other figures of the present disclosure. In FIG. 13, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 13. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 13. For example, in one embodiment, the transaction terminal (105) is an ATM machine, which includes components to dispense cash under certain conditions.

Account Identification Device

FIG. 14 illustrates an account identifying device according to one embodiment. In FIG. 14, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 14, such as a cellular communications subsystem.

In one embodiment, the communication device (159) may access the account information (142) stored on the memory (167) without going through the processor (151).

In one embodiment, the account identification device (141) has fewer components than those illustrated in FIG. 14. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 15, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 15. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 15, with more or fewer components.

In one embodiment, the transaction handler (103) is a payment processing system, or a payment card processor, such as a card processor for credit cards, debit cards, etc.

FIG. 15 illustrates a data processing system according to one embodiment. While FIG. 15 illustrates various components of a computer system, it is not intended to represent any particular architecture or manner of interconnecting the components. One embodiment may use other systems that have fewer or more components than those shown in FIG. 15.

In FIG. 15, the data processing system (170) includes an inter-connect (171) (e.g., bus and system core logic), which interconnects a microprocessor(s) (173) and memory (167). The microprocessor (173) is coupled to cache memory (179) in the example of FIG. 15.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing apparatus, comprising:
a portal configured to
receive location data from a mobile device, the location data identifying locations of the mobile device at a plurality of different time instances,
extract from the location data routes traversed by the mobile device, and
generate route words representing the routes, wherein each of the route words has an ordered list of location identifiers, each of the location identifiers representing a defined location;
a data storage device configured to store the route words in a route dictionary, wherein for each respective route identified by a respective route word, the route dictionary stores at least a frequency of the mobile device traversing the respective route and a time period during which the mobile device traverses the respective route;
wherein in response to the portal receiving an indication of a recently completed route of the mobile device, the portal is configured to
look up a plurality of route words from the route dictionary using at least one of:
a location identifier of a destination of the recently completed route, and
a location identifier of the origin of the recently completed route;
select a selected route word from the plurality of route words based at least in part on frequencies of the plurality of route words;
determine ranks of a plurality of data items based at least in part on distances of locations of the data items to a route represented by the selected route word;
select one or more selected data items based on the ranks;
look up from the route dictionary a time period of the selected route word during which the mobile device traverses the route represented by the selected route word; and
transmit the one or more selected data items to the mobile device a predetermined time period before a next trip of the mobile device traversing the route represented by the selected route word according to the time period of the selected route word.

2. The computing apparatus of claim 1, wherein the ranks of the plurality of data items are further based on affinity of a user of the mobile device to the data items.

3. The computing apparatus of claim 2, wherein the ranks of the plurality of data items are determined via:
determining a utility score for each of the data items; and
sorting the data items according to the utility score.

4. The computing apparatus of claim 3, wherein the utility score of each respective data item is a function of
a distance from a location of the respective data item to the route represented by the selected route word; and
an affinity measurement of the user of the mobile device to the data item.

5. The computing apparatus of claim 4, wherein the utility score of the respective data item decreases when the distance from the location of the respective data item to the route represented by the selected route word increases.

6. The computing apparatus of claim 4, wherein the utility score of the respective data item increases when the affinity measurement of the user of the mobile device to the data item increases.

7. The computing apparatus of claim 6, wherein the affinity measurement of the user of the mobile device to the data item is based on past data recording transactions between the user and a merchant of the data item.

8. A method, comprising:
receiving, in a portal of server, location data identifying locations of a mobile device at a plurality of different time instances;
extracting, by the portal of server from the location data, routes traversed by the mobile device;
generating, by the portal of server, route words representing the routes, wherein each of the route words has an ordered list of location identifiers, each of the location identifiers representing a defined location;
storing, in a data storage device, the route words in a route dictionary, wherein for each respective route identified by a respective route word, the route dictionary stores at least a frequency of the mobile device traversing the respective route and a time period during which the mobile device traverses the respective route;
receiving, in a computing apparatus, an indication of a recently completed route of the mobile device, the indication including a destination of the recently completed route and an origin of the recently completed route;
looking up, by the computing apparatus, a plurality of route words from the route dictionary, wherein each of the plurality of route words:
starts with a location identifier of the destination of the recently completed route, and
ends with a location identifier of the origin of the recently completed route;
selecting, by the computing apparatus, a selected route word from the plurality of route words based at least in part on frequencies of the plurality of route words;
ranking, by the computing apparatus, a plurality of data items based at least in part on distances of locations of the data items to a route represented by the selected route word;
selecting, by the computing apparatus, one or more selected data items based on the ranking;
looking up, by the computing apparatus, from the route dictionary a time period of the selected route word during which the mobile device traverses the route represented by the selected route word; and
transmitting, by the computing apparatus, the one or more selected data items to the mobile device a predetermined time period before a next trip of the mobile device traversing the route represented by the selected route word according to the time period of the selected route word.

9. The method of claim 8, wherein the ranking of the plurality of data items is further based on affinity of a user of the mobile device to the data items.

10. The method of claim 9, wherein the ranking of the plurality of data items includes:
determining a utility score for each of the data items; and
sorting the data items according to the utility score.

11. The method of claim 10, wherein the utility score of each respective data item is a function of
a distance from a location of the respective data item to the route represented by the selected route word; and
an affinity measurement of the user of the mobile device to the data item.

12. The method of claim 11, wherein the utility score of the respective data item decreases when the distance from the location of the respective data item to the route represented by the selected route word increases.

13. The method of claim 11, wherein the utility score of the respective data item increases when the affinity measurement of the user of the mobile device to the data item increases.

14. The method of claim 13, wherein the affinity measurement of the user of the mobile device to the data item is based on past data recording transactions between the user and a merchant of the data item.

15. A non-transitory computer storage medium storing instructions configured to instruct a computing apparatus to perform a method, the method comprising:
   tracking, by the computing apparatus, routes traveled by a user to generate a route dictionary;
   determining, by the computing apparatus, an origin and a destination of a recently completed travel route of the user;
   predicting, by the computing apparatus, an origin and a destination of a future travel based on the origin and the destination of the recently completed travel route;
   predicting, by the computing apparatus, a route of the future travel based on the predicted origin and the predicted destination of the future travel using the route dictionary of the user; and
   selecting, by the computing apparatus, at least one offer based on the predicted route.

16. The non-transitory computer storage medium of claim 15, wherein the selecting of the at least one offer comprises:
   identifying, by the computing apparatus, a plurality of offers along the predicted offer in the predetermined time period;
   determining, by the computing apparatus, utility scores of the offers based on distances of the offers to the predicted route and affinity of the user to merchants of the offers; and
   determining, by the computing apparatus, ranks of the offers based on the utility scores, wherein the at least one offer is selected based on the ranks.

17. The non-transitory computer storage medium of claim 15, wherein the route dictionary stores frequencies of the user traversing routes in the route dictionary; the predicting of the route of the future travel is based on the frequencies of routes in the dictionary that have the predicted origin and the predicted destination of the future travel.

18. The non-transitory computer storage medium of claim 15, wherein the route dictionary stores time periods in a day during which routes in the route dictionary have been traversed by the user; and the method further comprises:
   predicting, by the computing apparatus, a time period during which the user will traverse the predicted route by looking up a time period of the route in the route dictionary.

19. The non-transitory computer storage medium of claim 15, wherein the method further comprises:
   scheduling, by the computing apparatus, transmission of the at least one offer to a mobile device of the user based on the predicted time period.

20. The non-transitory computer storage medium of claim 19, wherein the method further comprises:
   transmitting, by the computing apparatus, the at least one offer to a mobile device of the user a predetermined time period before the predicted time period.

* * * * *